(12) United States Patent
Gipp

(10) Patent No.: US 9,690,499 B1
(45) Date of Patent: Jun. 27, 2017

(54) SYSTEMS AND METHODS FOR CLOUD-BASED DATA PROTECTION STORAGE

(75) Inventor: Stephan Gipp, Inver Grove Heights, MN (US)

(73) Assignee: Veritas Technologies, Mountain View, CA (US)

( * ) Notice: Subject to any disclaimer, the term of this patent is extended or adjusted under 35 U.S.C. 154(b) by 751 days.

(21) Appl. No.: 12/939,734

(22) Filed: Nov. 4, 2010

(51) Int. Cl.
G06F 12/00 (2006.01)
G06F 3/06 (2006.01)
G06F 11/14 (2006.01)

(52) U.S. Cl.
CPC ........ G06F 3/0619 (2013.01); G06F 11/1453 (2013.01); *G06F 11/1446* (2013.01)

(58) Field of Classification Search
CPC ............. G06F 11/1456; G06F 11/1464; G06F 11/1451
See application file for complete search history.

(56) References Cited

U.S. PATENT DOCUMENTS

| | | | |
|---|---|---|---|
| 8,650,159 B1 * | 2/2014 | Zhang et al. ................ | 707/664 |
| 2010/0332456 A1 * | 12/2010 | Prahlad et al. .............. | 707/664 |
| 2012/0084261 A1 * | 4/2012 | Parab ........................... | 707/654 |

OTHER PUBLICATIONS

Stephen Foskett, Enterprise Storage Strategies; http://developer.nirvanix.com/blogs/strategies/default.aspx; Taken from site on Dec. 9, 2010.
Stephen Foskett, Cloud Storage Flavors; Platform/Infrastructure and Service/Product; http://cloudcomputing.sys-con.com/node/1132937; Taken from site on Dec. 9, 2010.
Iron Mountain, Iron Mountain Delivers File Archiving Service; http://www.ironmountain.com/Content.aspx?id=17179872368; Taken from site on Dec. 9, 2010.
Paul Pathiakis, Port Request: gluster; http://lists.freebsd.org/pipermail/freebsd-ports/2009-March/053683.html; Taken from site on Dec. 9, 2010.
Gray, Content Based Backup Perl Script; http://256.com/gray/docs/content_based_backup/; Taken from site on Dec. 9, 2010.

* cited by examiner

*Primary Examiner* — Baboucarr Faal
(74) *Attorney, Agent, or Firm* — FisherBroyles LLP

(57) ABSTRACT

A computer-implemented method for cloud-based data protection storage may include (1) identifying a request to maintain a data protection image for a volume of data, (2) identifying a third-party storage service to use for storing the data protection image, (3) receiving a stream of data to apply to the data protection image, (4) buffering a portion of the stream of data, (5) writing the buffered portion of the stream to the third-party storage service as a single storage object, and (6) associating the single storage object with the buffered portion of the stream in a data map. Various other methods, systems, and computer-readable media are also disclosed.

20 Claims, 7 Drawing Sheets

SYSTEMS AND METHODS FOR CLOUD-BASED DATA PROTECTION STORAGE

BACKGROUND

Data-protection technologies (such as data-replication, continuous-data-protection, snapshot, and/or backup technologies) may enable organizations to protect and/or improve the reliability, fault-tolerance, and/or accessibility of their applications and/or data. For example, an organization may replicate, mirror, or otherwise copy data (or I/O operations directed to such data) from a primary site or device (such as an application server) to a secondary (i.e., backup) site or device for data-protection purposes.

Organizations have increasingly turned to cloud-based storage services as a target storage medium for data protection, as opposed to tape drives and other such media. Unfortunately, different cloud-based storage providers may use different storage models. For example, some cloud-based storage services may be file-system based while others may be object-store based. Furthermore, many cloud-based storage services may not offer random-access writes to stored files. Additionally, many cloud-based storage services may operate on the assumption that a client requiring storage has full sequential access to all data to be stored in the cloud. However, in the case of data protection, data may often be streamed from the source through one or more data movers.

Traditional data protection systems may deal with the variety of storage models exposed by various cloud-based storage services by using a custom storage interface for each cloud-based storage service. However, this attempted solution may result in increased development costs for data protection systems, slow deployment of cloud-based storage solutions, and/or incomplete support for cloud-based storage service. Accordingly, the instant disclosure identifies a need for additional and improved methods and systems for cloud-based data protection storage.

SUMMARY

As will be described in greater detail below, the instant disclosure generally relates to systems and methods for using cloud-based storage to protect data by (1) submitting buffered portions of a streamed data protection image to a third-party storage service (e.g., a cloud-based storage service) as single data objects and (2) maintaining data maps that associate the streamed data protection image with the data objects stored on the third-party storage service. In one example, a computing device may accomplish such a task by (1) identifying a request to maintain a data protection image for a volume of data, (2) identifying a third-party storage service to use for storing the data protection image, (3) receiving a stream of data to apply to the data protection image, (4) buffering a portion of the stream of data, (5) writing the buffered portion of the stream to the third-party storage service as a single storage object, and then (6) associating the single storage object with the buffered portion of the stream in a data map.

The third-party storage service may provide any of a variety of externalized storage models. In some examples, the third-party storage service may not allow random access writes.

The systems described herein may receive the stream of data in a variety of contexts. For example, the systems described herein may receive a stream of data of an initial image of the volume of data (e.g., when a data protection system first begins to provide data protection for the volume). Additionally or alternatively, the systems described herein may receive a stream of data updates to the volume of data (e.g., as a part of ongoing protection by a data protection system).

The amount of buffering performed when buffering the portion of the stream of data may depend on various factors. For example, the systems described herein may buffer the stream of data until a buffer for the stream of data is full. In this example, the size of the buffer may be configured based on the third-party storage service (e.g., the systems described herein may use different buffer sizes for different third-party storage services). Additionally or alternatively, the systems described herein may buffer the stream of data until the stream provides data out of sequence.

The data map may include a variety of information for associating the single storage object with the buffered portion of the stream. For example, the data map may include an identification of the single storage object on the third-party storage device and/or an offset within the stream of data corresponding to the single storage object.

In some examples, the systems described herein may use a write-once model to update the data protection image on the third-party storage service. For example, these systems may (1) determine that the buffered portion of the stream overwrites a portion of the data protection image, (2) identify a previous storage object on the third-party storage system corresponding to the overwritten portion, and then (3) update a data map entry of the previous storage object. In some examples, these systems may also determine that the single storage object no longer includes valid data for the data protection image and then delete the single storage object from the third-party storage service.

The systems described herein may also access one or more portions of the data protection image. For example, these systems may (1) identify a request to retrieve the data protection image, (2) read at least the single storage object from the third-party storage service, and then (3) reconstruct the data protection image with at least the single storage object using the data map.

As will be described in greater detail below, by submitting buffered portions of a data protection image to a third-party storage service as single data objects, the systems and methods described herein may provide access to third-party storage services with a variety of external storage models without requiring extensive configuration changes for each service. Additionally, in some examples these systems and methods may allow an administrator to easily optimize the data protection system for a given third-party storage service simply by manipulating the buffer size used for the streaming data.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
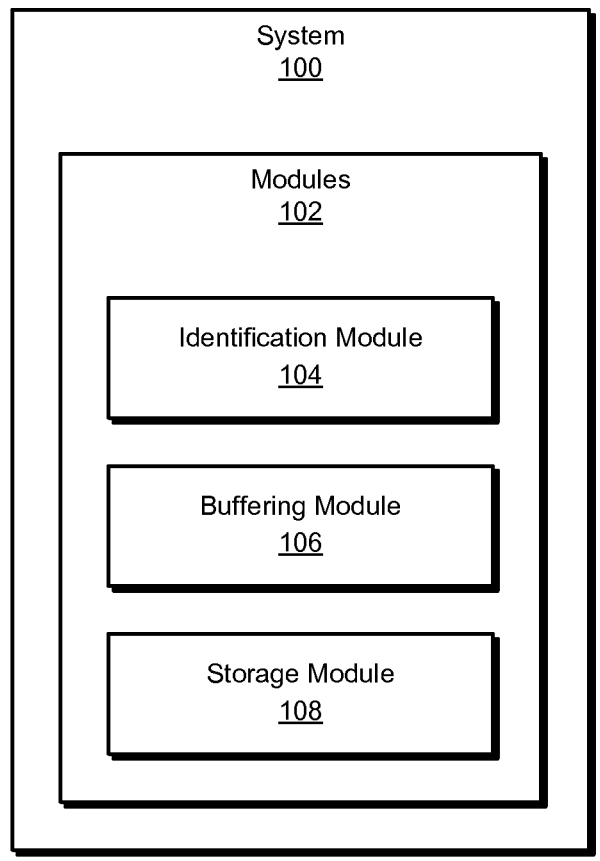
FIG. 1 is a block diagram of an exemplary system for cloud-based data protection storage.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
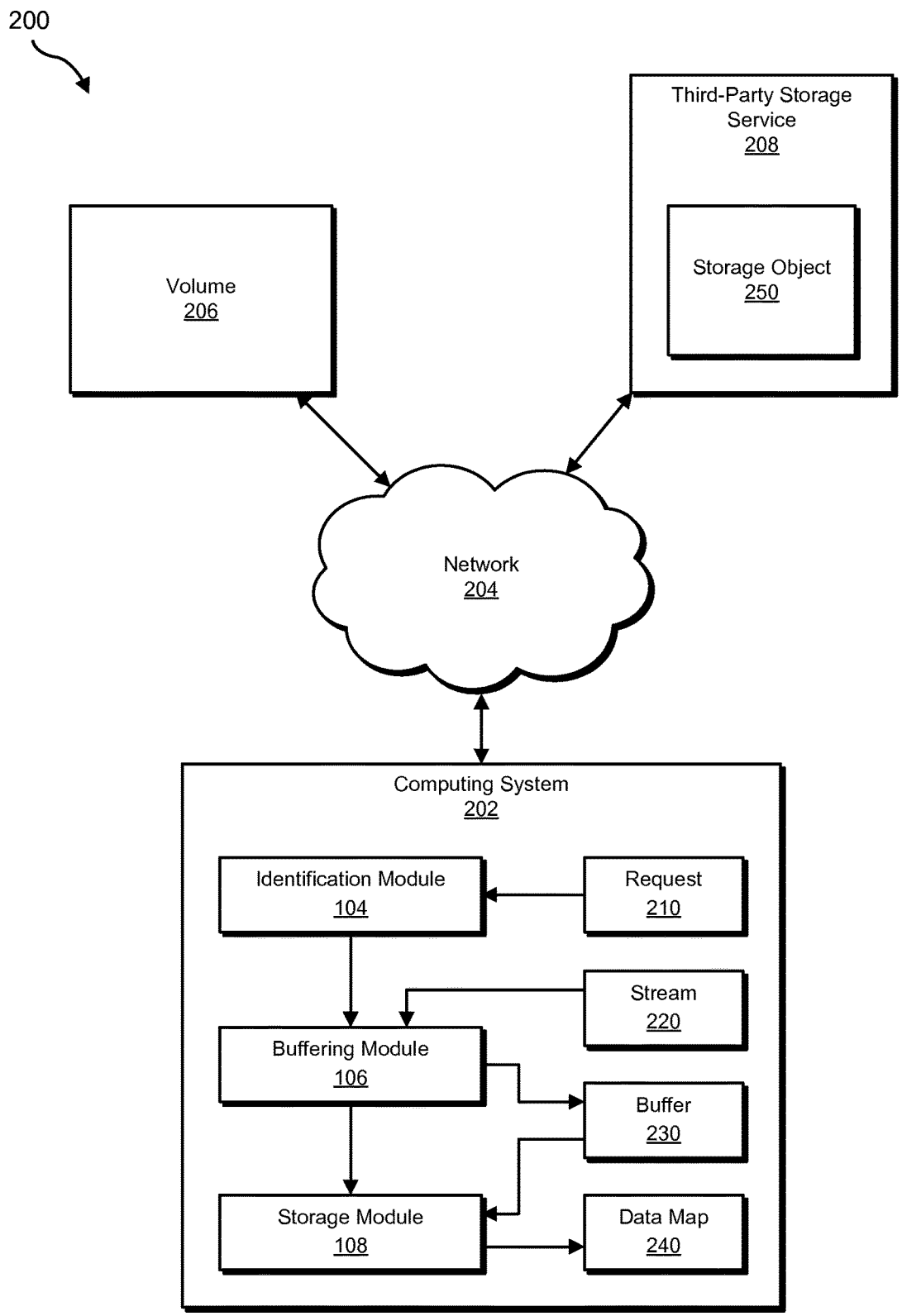
FIG. 2 is a block diagram of an exemplary system for cloud-based data protection storage.
Figure 4:
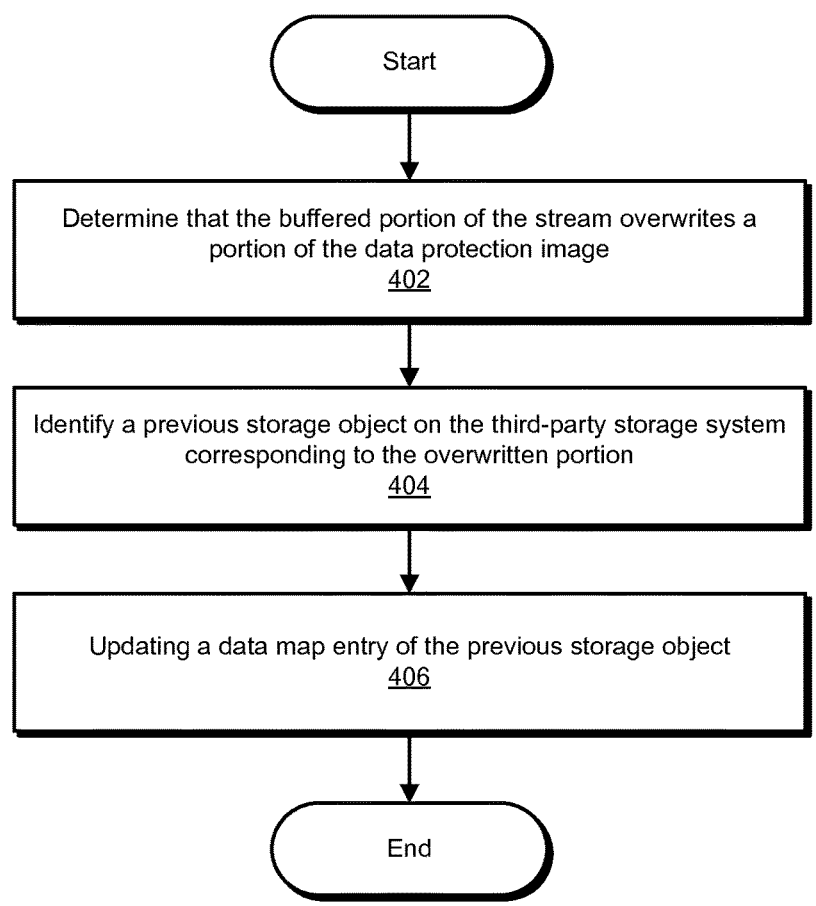
FIG. 4 is a flow diagram of an exemplary method for cloud-based data protection storage.
Figure 5:
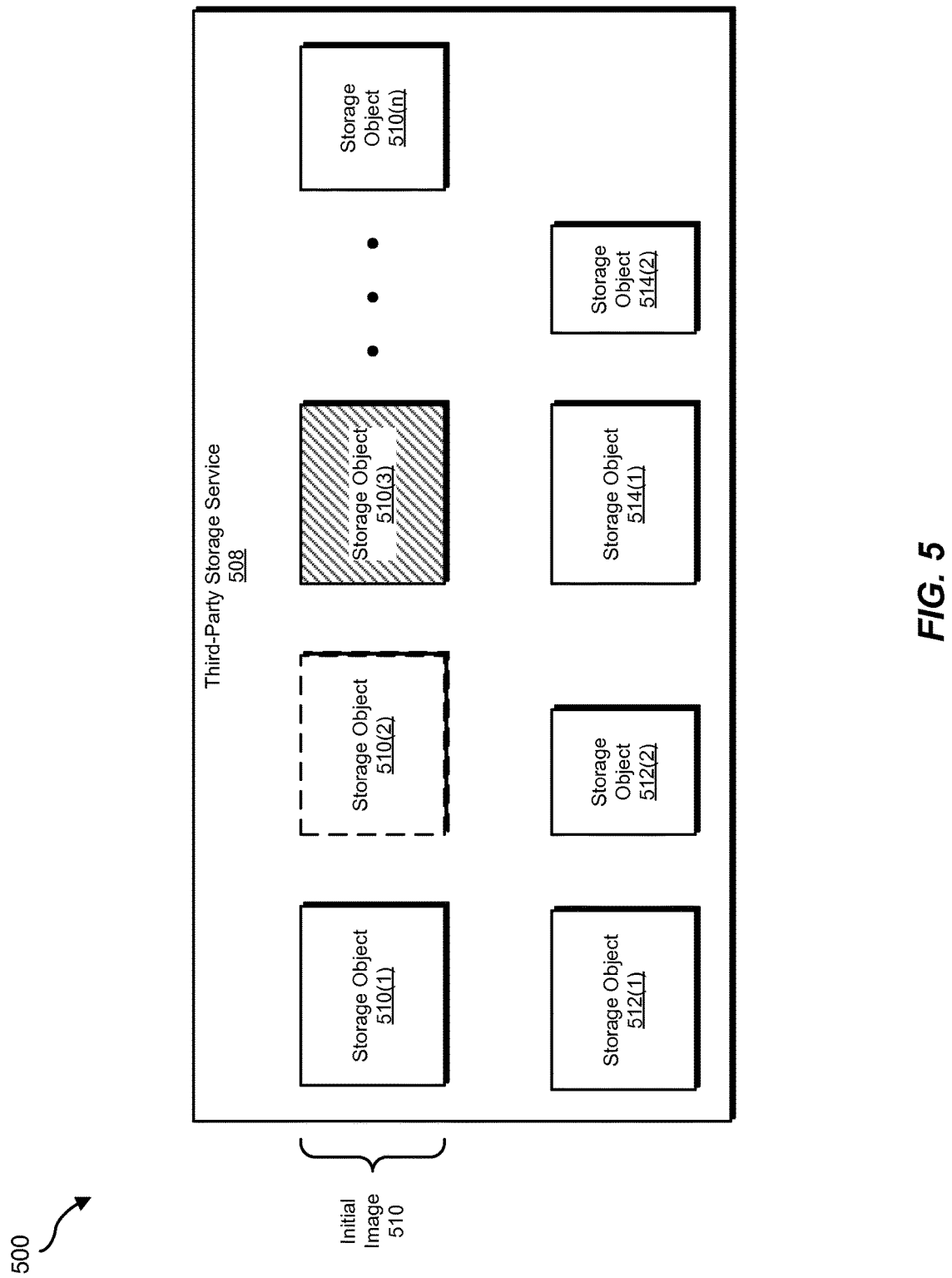
FIG. 5 is a block diagram of an exemplary system for cloud-based data protection storage.

The following will provide, with reference to FIGS. 1, 2, and 5, detailed descriptions of exemplary systems for cloud-based data protection storage. Detailed descriptions of corresponding computer-implemented methods will also be provided in connection with FIGS. 3-4. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for cloud-based data protection storage. As illustrated in this figure, exemplary system 100 may include one or more modules 102 for performing one or more tasks. For example, and as will be explained in greater detail below, exemplary system 100 may include an identification module 104 programmed to (1) identify a request to maintain a data protection image for a volume of data and (2) identify a third-party storage service to use for storing the data protection image. Exemplary system 100 may also include a buffering module 106 programmed to (1) receive a stream of data to apply to the data protection image and (2) buffer a portion of the stream of data.

In addition, and as will be described in greater detail below, exemplary system 100 may include a storage module 108 programmed to (1) write the buffered portion of the stream to the third-party storage service as a single storage object and (2) associate the single storage object with the buffered portion of the stream in a data map. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202, volume 206, and/or third-party storage service 208), computing system 610 in FIG. 6, and/or portions of exemplary network architecture 700 in FIG. 7. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a volume 206 and a third-party storage service 208 via a network 204.

In one embodiment, and as will be described in greater detail below, modules 102 from FIG. 1 may program computing system 202 to store data protection images on third-party storage systems by (1) identifying a request (e.g., a request 210) to maintain a data protection image for a volume of data (e.g., volume 206), (2) identifying a third-party storage service to use for storing the data protection image (e.g., third-party storage service 208), (3) receiving a stream of data to apply to the data protection image (e.g., a stream 220), (4) buffering a portion of the stream of data (e.g., to a buffer 230), (5) writing the buffered portion of the stream (e.g., from buffer 230) to the third-party storage service as a single storage object (e.g., a storage object 250), and (6) associating the single storage object with the buffered portion of the stream in a data map (e.g., a data map 240).

Computing system 202 generally represents any type or form of computing device capable of reading computer-executable instructions. Examples of computing system 202 include, without limitation, servers (including media servers), computing appliances, desktops, laptops, cellular phones, personal digital assistants (PDAs), multimedia players, embedded systems, combinations of one or more of the same, exemplary computing system 610 in FIG. 6, or any other suitable computing device.

Volume 206 may represent portions of a single volume or storage device or a plurality of volumes or storage devices. For example, volume 206 may represent a portion of computing system 610 in FIG. 6, such as primary storage device 632, and/or portions of exemplary network architecture 700 in FIG. 7, such as intelligent storage array 795. As used here, the term "volume" may refer to any distinctly identifiable collection of data.

Third-party storage service 208 generally represents any type or form of network-accessible storage service. For example, third-party storage service 208 may provide one or more storage targets (e.g., virtual servers). Third-party storage service 208 may use one or more servers and/or one or more storage devices in order to provide a storage target. In some examples, a "third-party storage service" may refer to cloud storage. For example, third-party storage service 208 may represent a web-based storage service. Additionally or alternatively, a "third-party storage service" may refer to a storage service that is not natively compatible with a data protection system.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 700 in FIG. 7, or the like. Network 204 may facilitate communication or data transfer using wireless or wired connections. In one embodiment, network 204 may facilitate communication between computing system 202, volume 206, and third-party storage service 208.

Figure 3:
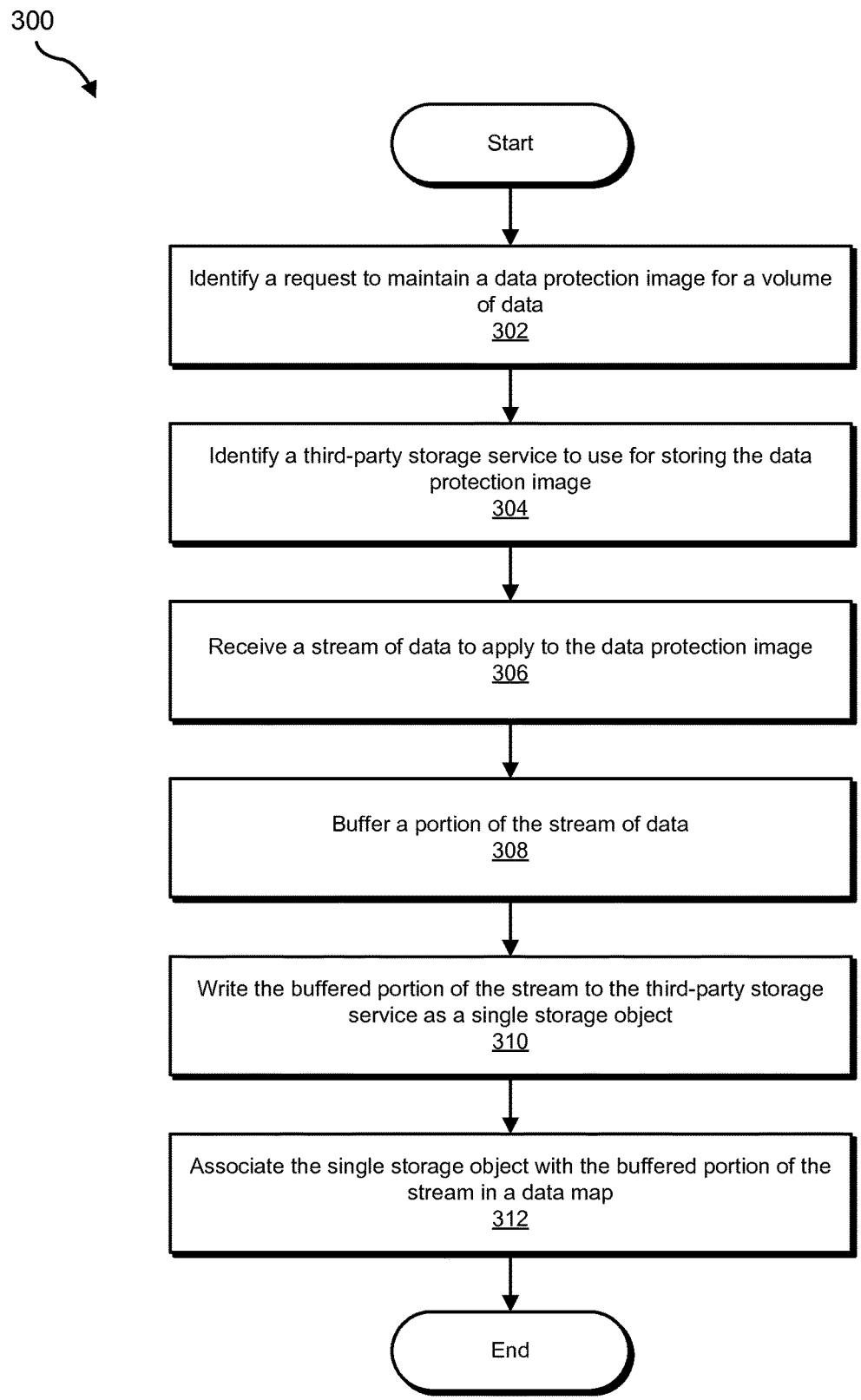
FIG. 3 is a flow diagram of an exemplary method for cloud-based data protection storage.

FIG. 3 is a flow diagram of an exemplary computer-implemented method 300 for cloud-based data protection storage. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a request to maintain a data protection image for a volume of data. For example, at step 302 identification module 104 may, as part of computing system 202 in FIG. 2, identify request 210 to maintain a data protection image for a volume 206.

As used herein, the phrase "data protection image" may refer to any collection of data for protecting and/or preserving a collection of primary data and/or I/O operations directed to primary data. Examples of data protection images include, without limitation, replications, mirrors, snapshots, backups, continuous-data-protection logs, etc.

Identification module 104 may perform step 302 in any suitable context. For example, identification module 104 may receive the request from a computing system to which the volume of data corresponds. Additionally or alternatively, identification module 104 may receive the request by reading a configuration file that identifies the volume of data. In some examples, identification module 104 may identify the request implicitly simply by detecting the volume of data.

At step 304, one or more of the systems described herein may identify a third-party storage service to use for storing the data protection image. For example, at step 304 identification module 104 may, as part of computing system 202 in FIG. 2, identify third-party storage service 208.

Identification module 104 may identify the third-party storage service in any suitable manner. For example, identification module 104 may read a configuration file identifying the third-party storage service as a storage target for the data protection image. Additionally or alternatively, identification module 104 may select the third-party storage service for storing the data protection image.

The third-party storage service may possess certain traits that may make data protection storage difficult for traditional technologies. In some examples, the third-party storage service may not allow random access writes. For example, the third-party storage service may allow only the creation of new data objects and the deletion of existing data objects. Accordingly, the third-party storage services may not allow simple updating of existing data. Additionally or alternatively, the third-party storage service may allow random access writes and/or another means of updating a file, but updating a file on the third-party storage service may be prohibitively and/or disproportionately expensive (e.g., an overwrite operation may take significantly longer than other write operations). In some examples, the third-party storage service may provide a file-system based storage interface. Additionally or alternatively, the third-party storage service may provide an object-based storage interface.

As will be described in greater detail below, although the systems described herein may use the third-party storage service for storing the data protection image, these systems may use unconventional methods and/or formats for storing data for the data protection image on the third-party storage service.

At step 306, one or more of the systems described herein may receive a stream of data to apply to the data protection image. For example, at step 306 buffering module 106 may, as part of computing system 202 in FIG. 2, receive stream 220. As used herein, the term "stream" may refer to a source of data that is provided sequentially over time.

Buffering module 106 may perform step 306 in any suitable context. For example, buffering module 106 may receive the stream of data from one or more data mover devices connected to the volume of data. Additionally or alternatively, buffering module 106 may receive the stream of data directly from a host computing system that writes to the volume of data.

In some examples, buffering module 106 may receive the stream of data during an initial stage of operation of a data protection system. For example, the stream may provide an entire initial copy of the volume of data in sequence. In subsequent contexts, buffering module 106 may receive a stream of data updates to the volume of data. For example, the stream may include write operations to new files performed on the volume of data, write operations to existing files, file deletions, etc. In various examples, the stream may include metadata about the location at which write operations begins followed by a string of sequential writes.

At step 308, one or more of the systems described herein may buffer a portion of the stream of data. For example, at step 308 buffering module 106 may, as part of computing system 202 in FIG. 2, buffer a portion of stream 220 to buffer 230. As used herein, the term "buffer" may refer to any buffer, cache, and/or other data structure or mechanism for gathering and/or storing stream data.

Buffering module 106 may perform step 308 in a variety of ways. For example, buffering module 106 may buffer the stream of data until a buffer for the stream of data is full. In this example, buffering module 106 may then temporarily stop reading from the stream. Additionally or alternatively, buffering module 106 may start writing to another buffer.

In some examples, the size of the buffer may be configurable. Additionally or alternatively, the size of the buffer may be configured based on the third-party storage service. For example, each third-party storage service may have an associated default buffer size. The size of the buffer as configured for the third-party storage service may correspond to a maximum transmission size allowed by the protocol used by the third-party storage service. Additionally or alternatively, the size of the buffer as configured for the third-party storage service may correspond to a maximally efficient transmission size given the protocol used by the third-party storage service. In some examples, the size of the buffer may also be configured based on characteristics of one or more networks connecting the buffer to the third-party storage system. For example, the size of the buffer may be configured to not interfere with local network traffic.

Buffering module 106 may also buffer the stream of data until the stream provides data out of sequence. For example, the stream may include an unbroken sequential write operation followed by a write operation for a different location on the volume of data. In this example, buffering module 106 may delimit the unbroken sequential write operation within the buffer.

At step 310, one or more of the systems described herein may write the buffered portion of the stream to the third-party storage service as a single storage object. For example, at step 310 storage module 108 may, as part of computing system 202 in FIG. 2, write buffer 230 to third-party storage service 208 as storage object 250.

As used herein, the term "single storage object" may refer to any file or other stored data object. As mentioned earlier, the third-party storage service may use a file system and/or an object-based storage system. Accordingly, the single storage object may represent a storage object within a file system, a storage object within an object-based storage system, and/or any other suitable storage object.

Storage module 108 may perform step 310 in any suitable manner. For example, storage module 108 may write the buffered portion of the stream to the third-party storage service by performing a single web service request to write the buffer (e.g., the buffered portion of the stream) to the third-party storage system. In some examples, storage module 108 may also clear the buffer after writing to the third-party storage system.

At step 312, one or more of the systems described herein may associate the single storage object with the buffered portion of the stream in a data map. For example, at step 312 storage module 108 may, as part of computing system 202 in FIG. 2, associate storage object 250 with the buffered portion of stream 220.

As used herein, the phrase "data map" may refer to any data structure capable of mapping, associating, and/or linking stored units of data (such as the single storage object) so as to enable the reconstruction of an image (such as a data protection image) from the stored units of data. For example, the data map may include an identification of the single storage object stored on the third-party storage service (e.g., a file name, a storage location, and/or a retrieval token for the single storage object). The data map may also include an offset within the stream of data corresponding to the single storage object, such that the portion of the stream of data represented by the single storage object could be reconstituted in the correct sequence within the stream. In some examples, the data map may specify an offset within the single storage object and/or a length within the single storage object. As will be described in greater detail below, the systems described herein may use this information when the stream overwrites a previous portion of the stream.

Storage module 108 may perform step 312 in any suitable manner. In some examples, storage module 108 may store the data map on a media server receiving the stream of data. After step 312, method 300 may terminate.

FIG. 4 is a flow diagram of an exemplary computer-implemented method 400 for cloud-based data protection storage. The steps shown in FIG. 4 may be performed by any suitable computer-executable code and/or computing system. In some embodiments, the steps shown in FIG. 4 may be performed by one or more of the components of system 100 in FIG. 1 and/or system 200 in FIG. 2.

As illustrated in FIG. 4, at step 402 one or more of the systems described herein may determine that the buffered portion of the stream overwrites a portion of the data protection image. For example, at step 402 storage module 108 may, as part of computing system 202 in FIG. 2, determine that the buffered portion of stream 220 overwrites a portion of the data protection image.

Storage module 108 may perform step 402 in any suitable manner. For example, storage module 108 may consult the data map to determine that the location of a write operation identified in the stream of data overlaps existing data in the volume of data. Additionally or alternatively, the stream may include metadata that indicates that the buffered portion of the stream overwrites a portion of the data protection image.

FIG. 5 is a block diagram of an exemplary system for cloud-based data protection storage. FIG. 5 illustrates a third-party storage service 508 storing data for a data protection image of a volume of data. Third-party storage service 508 may first receive storage objects 510(1)-(n) in sequence, representing an initial image 510 of the volume of data. Subsequent updates to the volume may be reflected by updates to the data protection image in the form of storage objects 512(1)-(2) and 514(1)-(2). In this example, storage objects 512(1)-(2) together may represent a sequential write operation. Storage object 512(1) may correspond to a location of the volume represented by storage object 502(2). Storage object 512(2) may correspond to a location of the volume represented by a portion of storage object 510(3).

Returning to step 402, storage module 108 may determine that a buffered portion of the stream overwrites a portion of the data protection image. For example, storage module 108 may determine that a buffered portion of the stream to be uploaded as storage object 512(1) in FIG. 5 overwrites a portion of the data protection image represented by storage object 510(2). As another example, storage module 108 may determine that a buffered portion of the stream to be uploaded as storage object 512(2) in FIG. 5 overwrites a portion of the data protection image represented by a portion of storage object 510(3).

At step 404, one or more of the systems described herein may identify a previous storage object on the third-party storage system corresponding to the overwritten portion. Storage module 108 may perform step 404 in any suitable manner. For example, storage module 108 may identify the previous storage object in the data map.

Using FIG. 5 as an example, at step 404 storage module 108 may identify storage object 510(3) on third-party storage service 508 as corresponding to a portion of the data protection image overwritten by storage object 512(2). In this example, a portion of storage object 510(3) may no longer include valid data. However, since the remaining portion of storage object 510(3) may still include valid data, storage object 510(3) may be left intact on third-party storage service 508.

In another example, at step 404 storage module 108 may identify storage object 510(2) on third-party storage service 508 as corresponding to a portion of the data protection image overwritten by storage object 512(1). In this example, storage object 510(2) may no longer contain any valid data (e.g., having been overwritten entirely by storage object 512(1). As will be described in greater detail below, storage module 108 may therefore delete storage object 510(2) from third-party storage service 508.

At step 406, one or more of the systems described herein may update a data map entry of the previous storage object. For example, storage module 108 may update the data map entry of storage object 510(2) in FIG. 5 by removing the data map entry of storage object 510(2). As another example, storage module 108 may update the data map entry of storage object 510(3) to reflect that only a portion of storage object 510(3) is valid after storage object 512(2) was created. In this example, storage module 108 may update the data map entry of storage object 510(3) by specifying an offset within storage object 510(3) (e.g., at which valid data begins) as well as a length within storage object 510(3) (e.g., of the remaining valid data). After step 406, method 400 may terminate.

As mentioned earlier, in some examples the systems described herein may delete an unneeded storage object. For example, storage module 108 may determine that the single storage object no longer includes valid data for the data protection image. Storage module 108 may make this determination by, e.g., examining the data map after a write operation and determining that the portion of the data protection image represented by the single storage object has been overwritten by one or more subsequent single storage objects. Accordingly, storage module 108 may delete the single storage object from the third-party storage service.

In some examples the systems described herein may access at least portion of the data protection image. For example, these systems may identify a request to retrieve the data protection image. In some examples, this request may include a request for the entire data protection image. Additionally or alternatively, the request may include a request for a portion of the data protection image. After identifying the request to retrieve the data protection image, these systems may read at least the single storage object (e.g., along with any other storage object needed) from the third-party storage service. For example, these systems may analyze the data map to determine which storage objects are needed from the third-party storage service and determine that the single storage object is among the needed storage objects. These systems may then reconstruct the data protection image with at least the single storage object using the data map. For example, these systems may use the valid portions of each storage object on the third-party storage service as identified by the data map. By reconstructing the data protection image (or portions thereof) as needed, these systems may provide access to data within the data protection image in an expected format (e.g., as if the data protection image were stored on a traditional storage device, such as a tape drive).

As detailed above, by submitting buffered portions of a data protection image to a third-party storage service as single data objects, the systems and methods described herein may provide access to third-party storage services with a variety of external storage models without requiring extensive configuration changes for each service. Additionally, in some examples these systems and methods may allow an administrator to easily optimize the data protection system for a given third-party storage service simply by manipulating the buffer size used for the streaming data.

Figure 6:
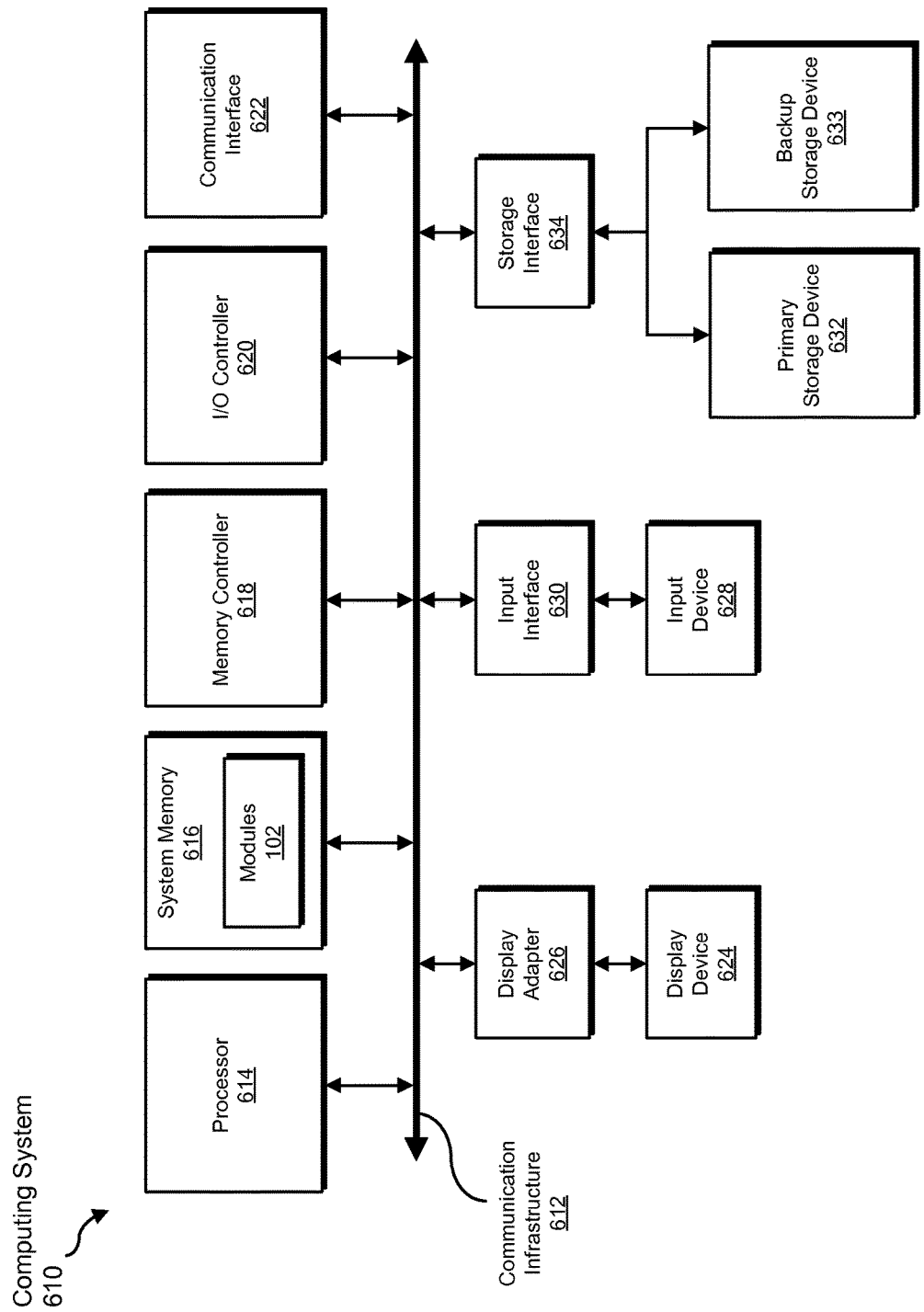
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein. For example, processor 614 may perform and/or be a means for performing, either alone or in combination with other elements, one or more of the identifying, receiving, buffering, writing, associating, determining, updating, deleting, reading, and/or reconstructing steps described herein. Processor 614 may also perform and/or be a means for performing any other steps, methods, or processes described and/or illustrated herein.

System memory 616 generally represents any type or form of volatile or non-volatile storage device or medium capable of storing data and/or other computer-readable instructions. Examples of system memory 616 include, without limitation, random access memory (RAM), read only memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an input/output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an ISA, PCI, PCIe, or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612. In certain embodiments, memory controller 618 may perform and/or be a means for performing, either alone or in combination with other elements, one or more of the steps or features described and/or illustrated herein, such as identifying, receiving, buffering, writing, associating, determining, updating, deleting, reading, and/or reconstructing.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634. I/O controller 620 may be used, for example, to perform and/or be a means for performing, either alone or in combination with other elements, one or more of the identifying, receiving, buffering, writing, associating, determining, updating, deleting, reading, and/or reconstructing steps described herein. I/O controller 620 may also be used to perform and/or be a means for performing other steps and features set forth in the instant disclosure.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution. In certain embodiments, communication interface 622 may perform and/or be a means for performing, either alone or in combination with other elements, one or more of the identifying, receiving, buffering, writing, associating, determining, updating, deleting, reading, and/or reconstructing steps disclosed herein. Communication interface 622 may also be used to perform and/or be a means for performing other steps and features set forth in the instant disclosure.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device. In at least one embodiment, input device 628 may perform and/or be a means for performing, either alone or in combination with other elements, one or more of the identifying, receiving, buffering, writing, associating, determining, updating, deleting, reading, and/or reconstructing steps disclosed herein. Input device 628 may also be used to perform and/or be a means for performing other steps and features set forth in the instant disclosure.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a floppy disk drive, a magnetic tape drive, an optical disk drive, a flash drive, or the like. Storage interface 634 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

In certain embodiments, storage devices 632 and 633 may be used, for example, to perform and/or be a means for performing, either alone or in combination with other elements, one or more of the identifying, receiving, buffering, writing, associating, determining, updating, deleting, reading, and/or reconstructing steps disclosed herein. Storage devices 632 and 633 may also be used to perform and/or be a means for performing other steps and features set forth in the instant disclosure.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an application specific integrated circuit (ASIC) adapted to implement one or more of the exemplary embodiments disclosed herein.

Figure 7:
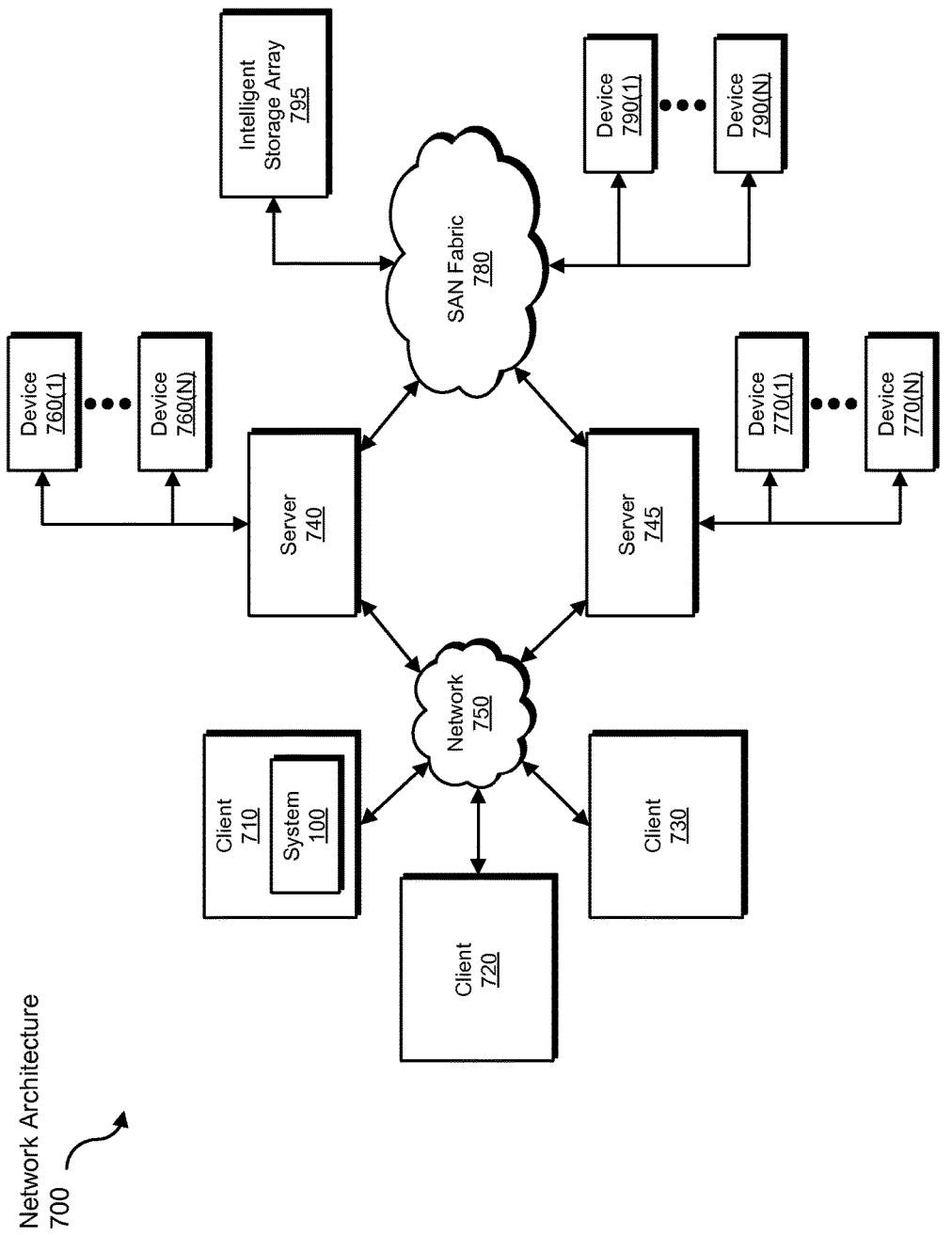
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750.

Client systems 710, 720, and 730 generally represent any type or form of computing device or system, such as exemplary computing system 610 in FIG. 6. In one example, client system 710 may include system 100 from FIG. 1.

Similarly, servers 740 and 745 generally represent computing devices or systems, such as application servers or database servers, configured to provide various database services and/or run certain software applications. Network 750 generally represents any telecommunication or computer network including, for example, an intranet, a wide area network (WAN), a local area network (LAN), a personal area network (PAN), or the Internet.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent network-attached storage (NAS) devices configured to communicate with servers 740 and 745 using various protocols, such as NFS, SMB, or CIFS.

Servers 740 and 745 may also be connected to a storage area network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

Accordingly, network architecture 700 may perform and/or be a means for performing, either alone or in combination with other elements, one or more of the identifying, receiving, buffering, writing, associating, determining, updating, deleting, reading, and/or reconstructing steps disclosed herein. Network architecture 700 may also be used to perform and/or be a means for performing other steps and features set forth in the instant disclosure.

As detailed above, computing system 610 and/or one or more components of network architecture 700 may perform and/or be a means for performing, either alone or in combination with other elements, one or more steps of an exemplary method for cloud-based data protection storage.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a media server into a system for efficiently storing data protection information using a cloud-storage service.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for cloud-based data protection storage, at least a portion of the method being performed by a computing device comprising at least one processor, the method comprising:
    identifying a data protection image for a volume of data stored using a third-party storage service;
    receiving a stream of data from at least one data mover to apply to the data protection image;
    buffering a portion of the stream of data received from the data mover;
    determining that the buffered portion of the stream of data received from the data mover overwrites a corresponding portion of the data protection image that corresponds to a portion of a previous storage object stored on the third-party storage service such that the corresponding portion of the previous storage object is no longer valid;
    writing the buffered portion of the stream of data received from the data mover to the third-party storage service as a single storage object;
    identifying a data map entry that maps an offset within the previous storage object stored on the third-party storage service to an offset within a previous stream of data corresponding to the previous storage object, thereby enabling reconstruction of a portion of the previous stream of data represented by the previous storage object in a correct sequence within the previous stream;
    updating, based on the determination that the buffered portion of the stream of data overwrites the corresponding portion of the data protection image, the offset within the previous storage object, as recorded in the data map entry to reflect the overwriting by the buffered portion of the stream of data.

2. The computer-implemented method of claim 1, further comprising optimizing a data protection system for the third-party storage service by manipulating a size of a buffer for the stream of data received from the data mover, wherein:
    receiving the stream of data from the data mover comprises receiving the stream of data as part of an operation of the data protection system;
    buffering the portion of the stream of data received from the data mover comprises buffering the stream of data received from the data mover until the buffer is full.

3. The computer-implemented method of claim 2, wherein the size of the buffer is configured based on the third-party storage service.

4. The computer-implemented method of claim 1, wherein buffering the portion of the stream of data received from the data mover comprises buffering the stream of data received from the data mover until the stream of data received from the data mover provides data out of sequence.

5. The computer-implemented method of claim 4, wherein buffering the stream of data until the stream of data provides data out of sequence comprises buffering the stream of data until the stream of data includes an unbroken sequential write operation followed by a write operation for a different location on the volume of data.

6. The computer-implemented method of claim 5, further comprising delimiting the unbroken sequential write operation within the buffer.

7. The computer-implemented method of claim 1, further comprising:
    determining that the corresponding portion of the previous storage object no longer comprises valid data;
    determining that a remaining portion of the previous storage object still comprises valid data;
    leaving the previous storage object on the third-party storage service based on the determination that the remaining portion of the previous storage object still comprises valid data;
    updating, based on the determination that the remaining portion of the previous storage object still comprises valid data, the data map entry to specify the offset within the previous storage object at which valid data begins and a length of the valid data within the previous storage object such that the data map entry reflects that only a portion of the previous storage object is valid.

8. The computer-implemented method of claim 7, further comprising:
    identifying a request to retrieve the data protection image;
    analyzing a data map comprising the data map entry to identify storage objects on the third-party storage service that are needed to retrieve the data protection image;
    determining that the storage objects on the third-party storage service that are needed to retrieve the data protection image comprise the previous storage object and the single storage object;
    reconstructing the data protection image with the remaining portion of the previous storage object and the single storage object using the data map entry.

9. The computer-implemented method of claim 1, wherein the third-party storage service does not allow random access writes.

10. The computer-implemented method of claim 1, wherein the stream of data comprises a stream of data updates to the volume of data.

11. The computer-implemented method of claim 1, wherein the previous storage object was created by:
    receiving the previous stream of data to apply to the data protection image;
    buffering a portion of the previous stream of data;
    writing the buffered portion of the previous stream of data to the third-party storage service as a single storage object, the single storage object comprising the previous storage object.

12. A system for cloud-based data protection storage, the system comprising:
    an identification module programmed to identify a data protection image for a volume of data stored using a third-party storage service;
    a buffering module programmed to:
        receive a stream of data from at least one data mover to apply to the data protection image;
        buffer a portion of the stream of data received from the data mover;
    a storage module programmed to:

determine that the buffered portion of the stream of data received from the data mover overwrites a corresponding portion of the data protection image that corresponds to a portion of a previous storage object on the third-party storage service such that the corresponding portion of the previous storage object is no longer valid;

write the buffered portion of the stream of data received from the data mover to the third-party storage service as a single storage object;

identify a data map entry that maps an offset within the previous storage object stored on the third-party storage service to an offset within a previous stream of data corresponding to the previous storage object, thereby enabling reconstruction of a portion of the previous stream of data represented by the previous storage object in a correct sequence within the previous stream;

update, based on the determination that the buffered portion of the stream of data overwrites the corresponding portion of the data protection image, the offset within the previous storage object, as recorded in the data map entry to reflect the overwriting by the buffered portion of the stream of data;

at least one processor configured to execute the identification module, the buffering module, and the storage module.

13. The system of claim 12, wherein:

the buffering module is further programmed to optimize a data protection system for the third-party storage service by manipulating a size of a buffer for the stream of data received from the data mover;

the buffering module is programmed to receive the stream of data from the data mover by receiving the stream of data as part of an operation of the data protection system;

the buffering module is programmed to buffer the portion of the stream of data received from the data mover by buffering the stream of data received from the data mover until the buffer is full.

14. The system of claim 13, wherein the size of the buffer is configured based on the third-party storage service.

15. The system of claim 12, wherein the buffering module is programmed to buffer the portion of the stream of data received from the data mover by buffering the stream of data received from the data mover until the stream of data received from the data mover provides data out of sequence.

16. The system of claim 12, wherein the storage module is further programmed to:

determine that the corresponding portion of the previous storage object no longer comprises valid data;

determine that a remaining portion of the previous storage object still comprises valid data;

leave the previous storage object on the third-party storage service based on the determination that the remaining portion of the previous storage object still comprises valid data;

update, based on the determination that the remaining portion of the previous storage object still comprises valid data, the data map entry to specify the offset within the previous storage object at which valid data begins and a length of the valid data within the previous storage object such that the data map entry reflects that only a portion of the previous storage object is valid.

17. The system of claim 16, wherein the storage module is further programmed to:

identify a request to retrieve the data protection image;

analyze a data map comprising the data map entry to identify storage objects on the third-party storage service that are needed to retrieve the data protection image;

determine that the storage objects on the third-party storage service that are needed to retrieve the data protection image comprise the previous storage object and the single storage object;

reconstruct the data protection image with the remaining portion of the previous storage object and the single storage object using the data map entry.

18. The system of claim 12, wherein the third-party storage service does not allow random access writes.

19. The system of claim 12, wherein the stream of data comprises a stream of data updates to the volume of data.

20. A non-transitory computer-readable-storage medium comprising one or more computer-executable instructions that, when executed by at least one processor of a computing device, cause the computing device to:

identify a data protection image for a volume of data stored using a third-party storage service;

receive a stream of data from at least one data mover to apply to the data protection image;

buffer a portion of the stream of data received from the data mover;

determine that the buffered portion of the stream of data received from the data mover overwrites a corresponding portion of the data protection image that corresponds to a portion of a previous storage object stored on the third-party storage service such that the corresponding portion of the previous storage object is no longer valid;

write the buffered portion of the stream of data received from the data mover to the third-party storage service as a single storage object;

identify a data map entry that maps an offset within the previous storage object stored on the third-party storage service to an offset within a previous stream of data corresponding to the previous storage object, thereby enabling reconstruction of a portion of the previous stream of data represented by the previous storage object in a correct sequence within the stream;

update, based on the determination that the buffered portion of the stream of data overwrites the corresponding portion of the data protection image, the offset within the previous storage object, as recorded in the data map entry to reflect the overwriting by the buffered portion of the stream of data.

\* \* \* \* \*